UNITED STATES PATENT OFFICE.

WILLIAM C. STEWART, OF BELLAIRE, OHIO.

PROCESS OF ENAMELING.

SPECIFICATION forming part of Letters Patent No. 529,670, dated November 20, 1894.

Application filed May 13, 1892. Serial No. 432,874. (Specimens.)

*To all whom it may concern:*

Be it known that I, WILLIAM C. STEWART, a citizen of the United States, residing at Bellaire, in the county of Belmont and State of Ohio, have invented certain new and useful Improvements in Processes of Enameling; and I do hereby declare the following to be a full, clear, and exact description of the invention, which will enable others skilled in the art to which it appertains to make and use the same.

My present invention has reference to certain improvements in the art as now practiced of enameling articles, such as culinary vessels, lamps, &c., by which a marbleized or variegated appearance or effect is produced. Articles enameled in different ways and under different processes by which this marbleized or variegated effect is accomplished, are well known on the market and are distinguished to the trade by the names "mottled ware," "granite ware," or "agate ware."

The processes employed prior to my invention for producing this peculiar effect, are more or less cumbersome and objectionable. One of these processes consists in making use of an acid in the enamel composition, which will oxidize the iron of the article, so as to produce irregular darkened spots. This process is objectionable, as it is a lengthy and expensive one to practice, and the presence of an acid in the enamel composition, especially one applied to culinary vessels, is objectionable for sanitary reasons. Another process for producing this peculiar effect consists of applying a colored coat to a foundation coating, by means of a brush or otherwise by which the darkened spots are produced. An objection to this process, in addition to the fact that it is also a lengthy and expensive one to practice, is that the surface produced is more or less irregular to the eye and touch.

My process is less expensive than either of the above; the use of an acid in the composition is entirely done away with; and the surface produced is entirely smooth and regular.

In carrying out my improved process, I proceed substantially as follows: I prepare a white enamel in any suitable way and of any appropriate ingredients, which is placed in a separate vessel. This white enamel is made especially thin, by the addition of water or otherwise. I also make use preferably of a blue enamel composition which is made thick and pasty by the addition of clay and calcium carbonate to the usual and proper ingredients. It is not necessary that the first enamel composition should be white and the second enamel composition should be blue, for they may be of any other contrasting colors.

My present invention has no reference to the particular ingredients used for the two enamel compositions, and any well known formulas may be employed. The article which is to be decorated, having been first provided with a usual ground or foundation coating, is first immersed in the white composition so as to be thoroughly coated. It is then removed and is shaken gently or allowed to drip so that all superfluous enamel will drain off and the article will be coated evenly. Before the white coat of enamel is allowed to dry and while it is still soft and pliable, the blue coat is applied in spots to suit the taste by means of a brush or otherwise. The blue enamel by reason of its greater weight displaces to a certain extent the thin white coating, and very beautiful effects are produced, caused by the slight running of the heavier coat. By reason of the difference in the manner in which the two coats of enamel are prepared and of the difference in character between them, I have found that there is no mixing or blending of the colors, but the colors remain perfectly distinct and clear. The blue enamel by reason of its greater weight, tends to settle down to the same level as the white enamel, so that the surface which is produced is perfectly smooth and even. The article thus prepared is now carefully dried and burned in the usual way.

Articles enameled in accordance with my improved process as above outlined, can be produced more cheaply than heretofore, for the reason that but one burning operation is necessary in connection with the finishing coat.

Having now described my invention, what I claim as new therein, and desire to secure by Letters Patent, is as follows:

1. An improved process of enameling articles, which consists in applying a thin coating so as to cover so much of the article as is desired to be enameled, then, while the thin coating is wet, in applying a second partial coating of a contrasting color in the form of spots or blotches, then in drying the article and finally in firing it, substantially as and for the purposes set forth.

2. An improved process of enameling articles, which consists in applying a thin coating so as to cover so much of the article as is desired to be enameled, then, while the thin coating is still wet, in applying a second partial coating of a contrasting color in the form of spots or blotches, said partial coating being thicker and heavier than the thin coating, whereby said spots or blotches will displace the thin coating, then in drying the article, and finally in firing it, substantially as and for the purposes set forth.

3. An improved process of enameling articles, which consists in applying a thin coating so as to cover so much of the article as is desired to be enameled, then, while the thin coating is still wet, in applying in spots or blotches a second partial coating of a contrasting color, made especially thick and pasty by the addition of clay and calcium carbonate, so as to displace the thin coating, then in drying the article, and finally in firing it, substantially as and for the purposes set forth.

WILLIAM C. STEWART.

In presence of—
MARTIN COWEN,
ELLSWORTH HIBBS.